(12) United States Patent
Albanese

(10) Patent No.: US 10,413,047 B2
(45) Date of Patent: Sep. 17, 2019

(54) HAT HOLDER

(71) Applicant: Lindsay Albanese, Venice, CA (US)

(72) Inventor: Lindsay Albanese, Venice, CA (US)

( * ) Notice: Subject to any disclaimer, the term of this patent is extended or adjusted under 35 U.S.C. 154(b) by 0 days.

(21) Appl. No.: 15/939,549

(22) Filed: Mar. 29, 2018

(65) Prior Publication Data

US 2018/0368602 A1    Dec. 27, 2018

Related U.S. Application Data

(60) Provisional application No. 62/525,431, filed on Jun. 27, 2017.

(51) Int. Cl.
| | | |
|---|---|---|
| *A45F 5/06* | (2006.01) |
| *A47G 25/10* | (2006.01) |
| *A45F 5/00* | (2006.01) |
| *A44B 99/00* | (2010.01) |
| *A44B 13/02* | (2006.01) |
| *A42B 7/00* | (2006.01) |
| *A45F 5/02* | (2006.01) |
| *A45C 13/10* | (2006.01) |
| *A45C 13/30* | (2006.01) |
| *A45C 13/40* | (2006.01) |
| *F16B 45/02* | (2006.01) |
| *A42B 1/00* | (2006.01) |
| *F16B 1/00* | (2006.01) |

(52) U.S. Cl.
CPC .................. *A45F 5/06* (2013.01); *A42B 7/00* (2013.01); *A44B 13/02* (2013.01); *A44B 99/00* (2013.01); *A45C 13/1069* (2013.01); *A45C 13/30* (2013.01); *A45C 13/40* (2013.01); *A45F 5/00* (2013.01); *A45F 5/021* (2013.01); *A47G 25/10* (2013.01); *A42B 1/00* (2013.01); *A44D 2203/00* (2013.01); *A45C 2013/306* (2013.01); *F16B 45/02* (2013.01); *F16B 2001/0035* (2013.01)

(58) Field of Classification Search
CPC ... A47G 25/10; A45F 5/00; A45F 5/06; A45F 5/021; A45C 13/40; A45C 13/30; A45C 13/1069
USPC .................................. 24/3.13, 303; 224/269
See application file for complete search history.

(56) References Cited

U.S. PATENT DOCUMENTS

| | | | | |
|---|---|---|---|---|
| 2,615,227 | A * | 10/1952 | Hornik ................. | A44C 5/2071 24/303 |
| 2,771,230 | A * | 11/1956 | Fitzpatrick ............. | A42B 1/248 224/254 |
| 5,890,638 | A * | 4/1999 | Woloshen ................ | A45F 5/02 224/191 |
| 9,408,992 | B2 * | 8/2016 | Smith-Reynolds ......................... | A61M 16/0683 |
| 2009/0106944 | A1 * | 4/2009 | Hsu ...................... | A44C 5/2076 24/3.4 |

(Continued)

*Primary Examiner* — Abigail E Troy
(74) *Attorney, Agent, or Firm* — Maskell Law PLLC; Benjamin E. Maskell

(57) ABSTRACT

Disclosed is a hat holding including a first strap having a first end and a second end, a second strap having a first end and a second end, the second strap joined to the first strap, a first ferromagnetic member disposed at the first end of the first strap, a second ferromagnetic member disposed the first end of the second strap, and a hook coupled to the first strap. The first strap and the second strap are configured to be separably joined at their respective first ends by a magnetic attraction between the first ferromagnetic member and the second ferromagnetic member.

18 Claims, 8 Drawing Sheets

(56) References Cited

U.S. PATENT DOCUMENTS

2015/0115008 A1\* 4/2015 Griffith ................... A45F 5/06
224/269

\* cited by examiner

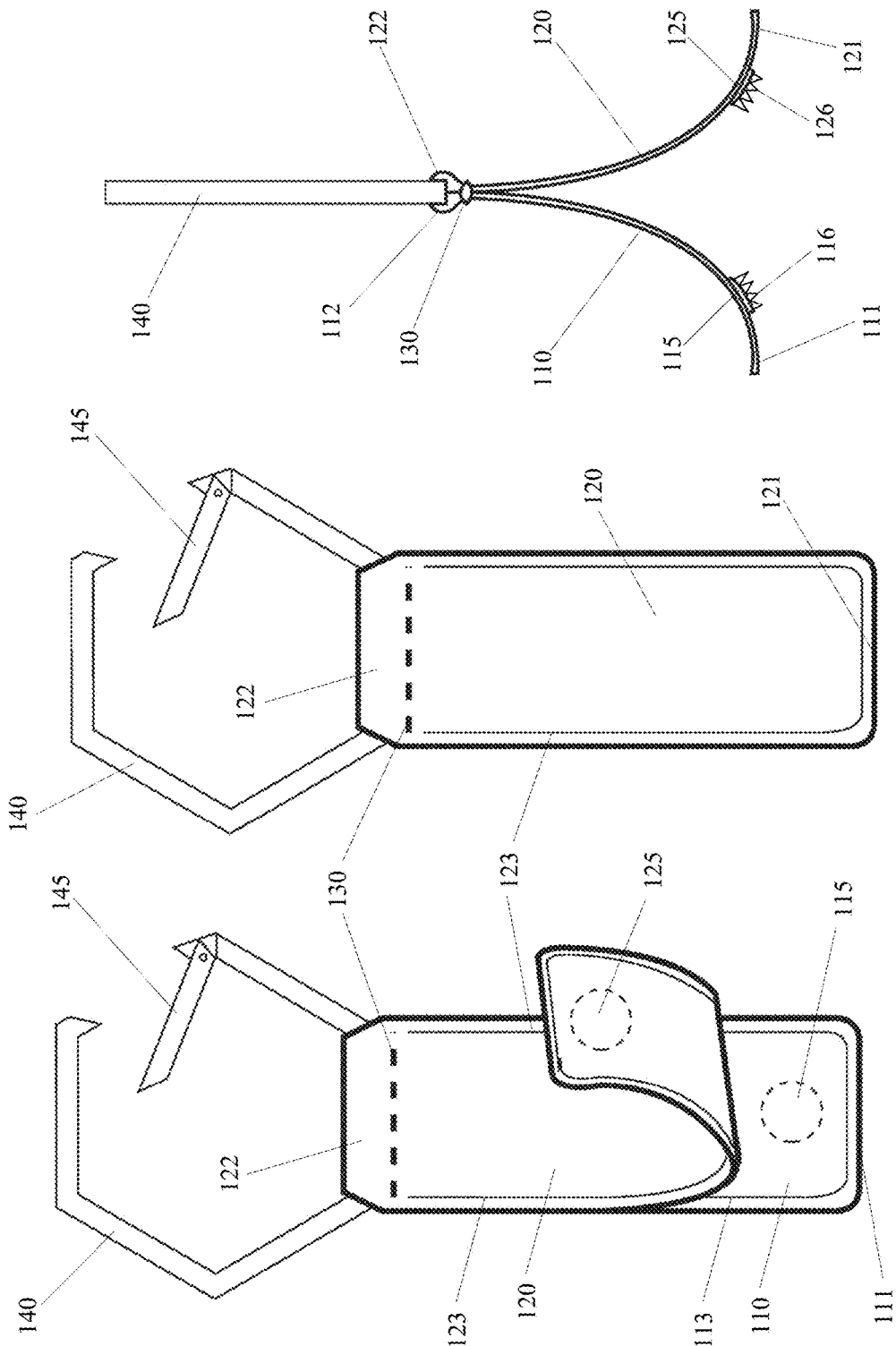

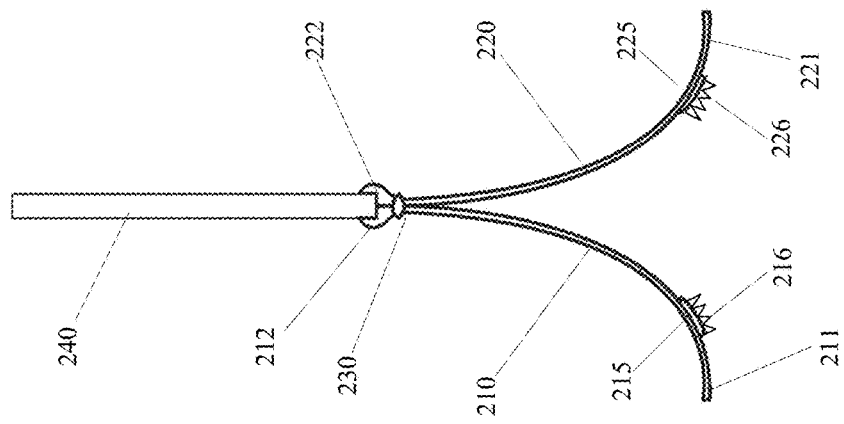
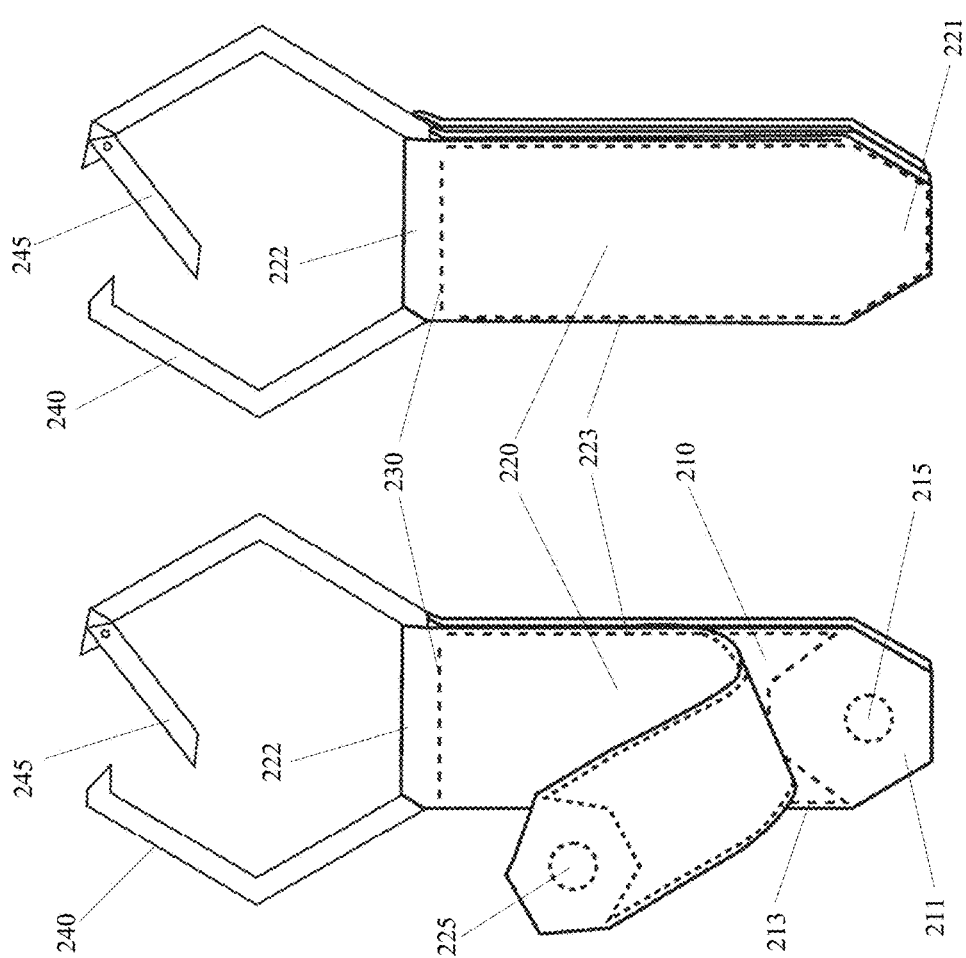
FIG. 2A   FIG. 2B   FIG. 2C

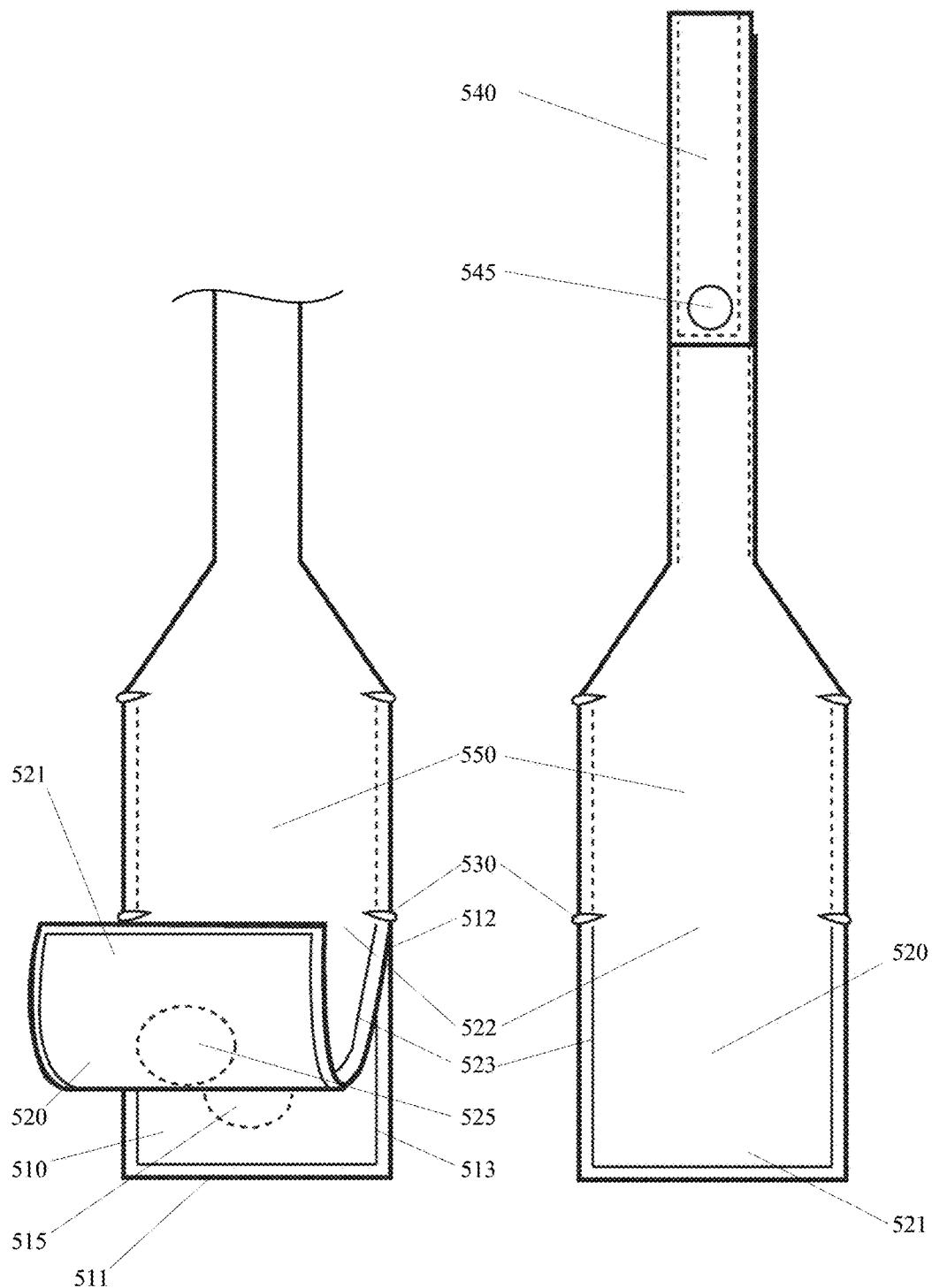

HAT HOLDER

This application is a non-provisional of U.S. Provisional Application 62/525,431 filed Jun. 27, 2017, the entirety of which is hereby incorporated by reference.

BACKGROUND OF THE INVENTION

Field of the Invention

The embodiments of the invention relate to a hat holder, and more particularly, to a fashionable hat holder of simple construction. Although embodiments of the invention are suitable for a wide scope of applications, it is particularly suitable for keeping a hat close at hand without cumbersome hat boxes.

Discussion of the Related Art

Hats are fashion accessories that have transcended the ages. One problem with a hat, however, is how to carry or store a hat when it is not being worn. When a wearer is at a home or an office, a hat can easily be stored on a shelf, hook, or in a hat box. However, if a wearer is outside or traveling it can be cumbersome to accommodate or store a hat without damaging it.

One solution of the related art is a hat box. A hat box is generally a rigid-walled box sized in relative proportions to store a hat when not in use. While hat boxes can effectively store and protect a hat, hat boxes can be large an unwieldy— an inconvenient proposition for portability.

Alternatively, a hat can simply be carried with a free hand. Carrying a hat, however, has the undesirable effect of encumbering the wearer and leaving the hat exposed to accidental damage. Some hats of the related art have a string and the hat can be worn around the neck such as are common on "bucket" style hats and some sun hats. Strings, however, can be encumbering or simply not compatible with the style of the day on fashion hats. In still another alternative, a hat can be store in a briefcase or bag although at risk of compression damage to the hat.

Thus, the currently known solutions for holding a hat are inconvenient, cumbersome, not stylish, or risk damage to the hat and there is a need for a device to store a hat when it is not being worn to address the aforementioned problems.

SUMMARY OF THE INVENTION

Accordingly, embodiments of the invention are directed to a hat holder that substantially obviates one or more of the problems due to limitations and disadvantages of the related art.

An object of embodiments of the invention is to provide a hat holder that is small and compact in size.

Another object of embodiments of the invention is to provide a hat holder that is fashionable.

Yet another object of embodiments of the invention is to provide a hat holder that can accommodate a variety of hats.

Still another object of embodiments of the invention is to provide a hat holder that is portable.

Another object of embodiments of the invention is to provide a hat holder that securely retains a hat and can be easily stored when not in use.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a hat holder includes a first strap having a first end and a second end, a second strap having a first end and a second end, the second strap joined to the first strap, a first ferromagnetic member disposed at the first end of the first strap, a second ferromagnetic member disposed the first end of the second strap, a hook coupled to the first strap, wherein the first strap and the second strap are configured to be separably joined at their respective first ends by a magnetic attraction between the first ferromagnetic member and the second ferromagnetic member.

In another aspect, a hat holder includes a first strap having a first end and a second end, a second strap having a first end and a second end, the second strap joined to the first strap at their respective second ends, a magnet coupled to the first end of the first strap, a ferromagnetic member coupled to the first end of the second strap, a hook coupled to the second end of the first strap; wherein the first strap and the second strap are configured to be separably joined at their respective first ends by a magnetic attraction between the magnet member and the ferromagnetic member.

In yet another aspect, a hat holder includes a first strap having a first end and a second end, a second strap having a first end and a second end, the second strap joined to the first strap at their respective second ends, a magnet coupled to the first end of the first strap, a ferromagnetic member coupled to the first end of the second strap, wherein the first strap and the second strap are configured to be separably joined at their respective first ends by a magnetic attraction between the magnet member and the ferromagnetic member.

In still another aspect, a hat holder includes a first strap having a first end and a second end, a hook coupled to the first end of the first strap, and a clip coupled to second end of the strap, the clip configured to retain a portion of a hat therein.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

FIG. 1A-1C are illustrations of a hat holder according to an exemplary embodiment of the invention;

FIG. 2A-2C are illustrations of a hat holder according to an exemplary embodiment of the invention;

FIG. 5A-5B are illustrations of a hat holder according to an exemplary embodiment of the invention;

DETAILED DESCRIPTION OF THE PREFERRED EMBODIMENTS

Figures 3A, 3B, 3C:
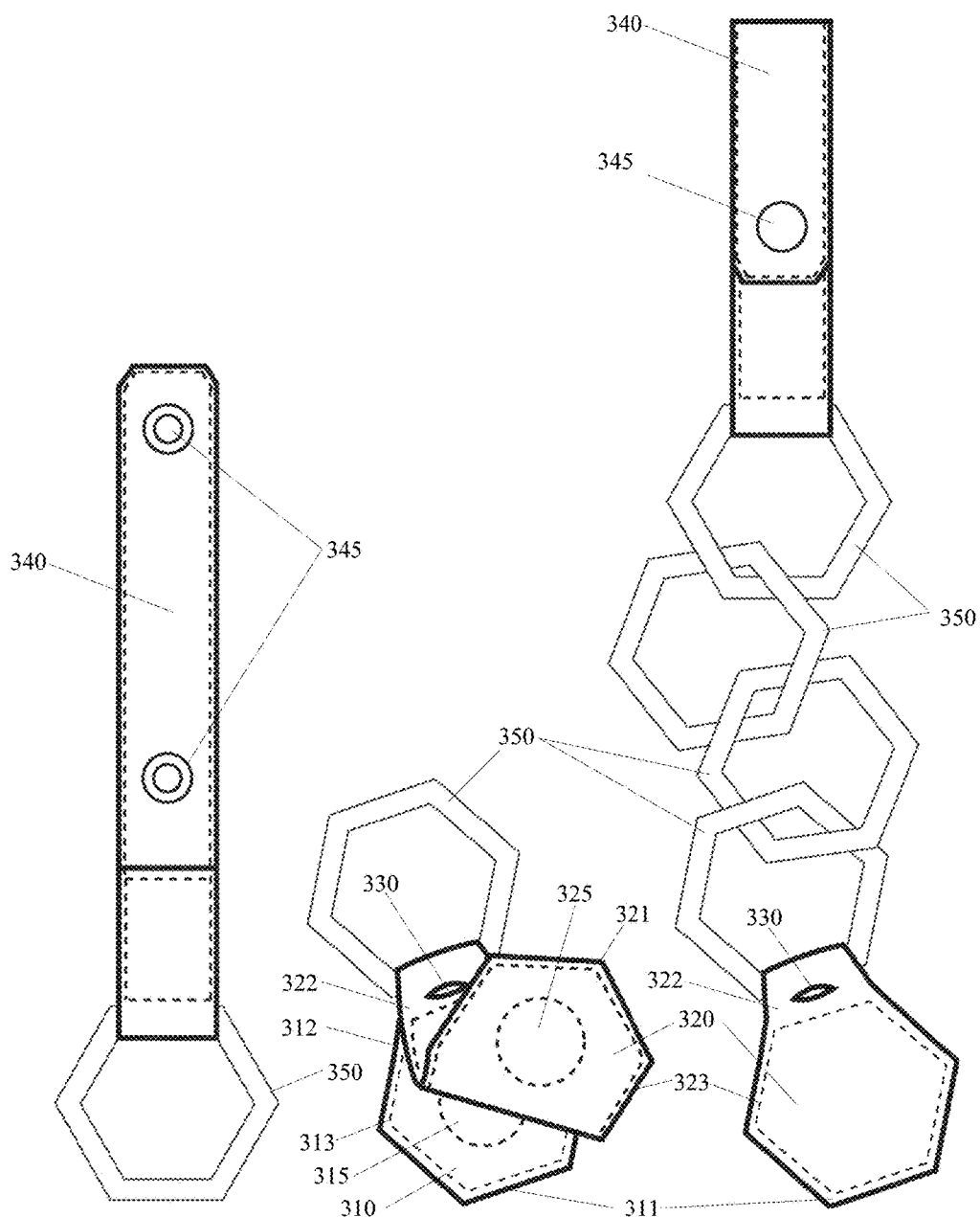
FIG. 3A-3C are illustrations of a hat holder according to an exemplary embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1A and FIG. 1B are front-view illustrations of a hat holder according to an exemplary embodiment of the invention and FIG. 1C is a side-view illustration of a hat holder according to an exemplary embodiment of the invention. As shown in FIG. 1A-1C, a hat holder includes a rear strap 110, a front strap 120, a connection 130, and hook 140. The rear strap 110 can have a ferromagnetic member 115, bottom end 111, a top end 112, and perimeter stitching 113. The front strap 120 can have a ferromagnetic member 125, a bottom end 121, a top end 122, and perimeter stitching 123. The hook 140 can have a gate 145. The ferromagnetic members 115 and 125 can have gripping members such as spikes 116 and 126, respectively.

The rear strap 110 and the front strap 120 can be coupled together at their top end via connection 130. The connection 130 can be stitching, cleats, rivets, buttons, snaps, or other methods of mechanical coupling known in the art of textiles. The rear strap 110 and the front strap 120 can be formed from a single piece of material that is folded approximately in half where a first half can be the rear strap 110 and a second half can be the front strap 120. Thus, although the rear strap 110 and the front strap 120 are referred throughout the specification as separate straps, those of skill in the art will appreciate that the rear strap 110 and the front strap 120 can be formed from a single piece of material.

The rear strap 110 and the front strap 120 can be formed from leather, nylon, plastic, cotton, or other natural or man-made materials. The rear strap 110 and the front strap 120 are desirably flexible, although rigid materials are contemplated. The rear strap 110 and the front strap 120 are desirably formed from the same type of material and, in preferred embodiments of the invention, are formed from nylon webbing, leather, or leatherette. When the rear strap 110 and the front strap 120 are formed from a single piece of material, the single piece of material can be folded over the hook 140. The connection 130 can securely bind the rear strap 110 and the front strap 120 to the hook.

The rear strap 110 and the front strap 120 can each, respectively, be formed from a double layer of material. When the rear strap 110 and the front strap 120 are formed from a double layer of material, perimeter stitching 113 on the rear strap 110 and perimeter stitching 123 on the front strap 120 can bind the double layer together.

The rear strap 110 can have a ferromagnetic member 115 near its lower end 111 and the front strap 120 can have a ferromagnetic member 125 in its lower end 121. The ferromagnetic member 115 and 125 can be, for example, formed from a ferrous material such as iron disks or washers. The ferromagnetic member 115 and 125 can be permanent magnets such as neodymium disk-shaped magnets. In embodiments of the invention the ferromagnetic member 115 is an iron disk and the ferromagnetic member 125 is a neodymium disk-shaped magnet. In preferred embodiments of the invention, the ferromagnetic members 115 and 125 are both neodymium disk-shaped magnets each having a positive pole on one flat side of the disk and having an opposite, negative pole, on the other side of the disk. When the ferromagnetic members 115 and 125 are both magnets, they can be disposed at the respective lower ends 111 and 121 such that the opposite poles face one another. The lower ends 111 and 121 can be held together by the force of magnetic attraction between the ferromagnetic members 115 and 125.

In use, the brim of a hat can be placed between the ferromagnetic members 115 and 125 and the force of magnetic attraction between the ferromagnetic members 115 and 125 can substantially hold the hat between the ferromagnetic members 115 and 125. A hat retained in the hat holder of the present invention can allow a user to carry a hat "hands-free" thereby freeing the user's hands to engage in other activities and relieving the user of the burden of carrying or stowing a hat.

Embodiments of the invention can include gripping members such as spikes 116 and 126 near the ferromagnetic members 115 and 125. The gripping members 116 and 126 can concentrate the force between the ferromagnetic members 115 and 125 over a smaller area more effectively pinching or gripping a hat inserted therebetween. The size and number of gripping members 116 and 126 has been exaggerated in the attached drawings for clarity and ease of illustration. Those of skill in the art will appreciate that that the materials, number, arrangement, and size of the gripping members can be chosen to suit hats of varying compositions. Although the embodiment of FIG. 1C is shown as having gripping members 116 and 126 on both the rear strap 110 and the front strap 120, it is contemplated that gripping members 116 and 126 may only be present on only one of the rear strap 110 or the front strap 120. When the gripping members 116 and 126 are spikes as illustrated in FIG. 1C, the spikes are preferably made from metal pins or injection molded plastic formed in ridges or rows. In other embodiments, the gripping members 116 and 126 are formed from an abrasive material such as sandpaper or sticky material such as silicon. The force of magnetic attraction between the ferromagnetic members 115 and 125 can press the gripping members 116 and 126 into the hat to more securely retain the hat therein.

The rear strap 110 and the front strap 120 are preferably formed from a double layer of material and the ferromagnetic members 115 and 125 are preferably disposed between the double layers of material. Stitching, glue, rivets, or other fasteners can hold the ferromagnetic members 115 and 125 in place. In other embodiments, the ferromagnetic members 115 and 125 can be surface mounted on the rear strap 110 and the front strap 120.

The rear strap 110 and the front strap 120 can be connected to a hook 140. The hook 140 can be used to attach the assembly to another object such as a beltloop or an eyelet on a suitcase or purse. The hook 140 can have a spring-loaded gate 145 that can prevent the hook from becoming inadvertently dislodged.

Embodiments of the invention can omit the hook 140 and instead the top ends 112 and 122 can be permanently attached to another object. For example, the top ends 112 and 122 can be sewn into the inside of a purse or travel bag. When not in use, the whole assembly can be disposed out of sight inside the purse or travel bag. In use, the lower ends 111 and 121 can be pulled to the outside of the purse or travel bag and be used to engage and retain the brim of a hat. In this way, a hat so retained can "ride" on the outside of the purse or travel bag.

FIG. 2A and FIG. 2B are front-view illustrations of a hat holder according to an exemplary embodiment of the invention and FIG. 2C is a side-view illustration of a hat holder according to an exemplary embodiment of the invention. As shown in FIG. 2A-2C, a hat holder includes a rear strap 210, a front strap 220, a connection 230, and hook 240. The rear strap 210 can have a ferromagnetic member 215, bottom end 211, a top end 212, and perimeter stitching 213. The front strap 220 can have a ferromagnetic member 225, a bottom end 221, a top end 222, and perimeter stitching 223. The hook 240 can have a gate 245. The ferromagnetic members 215 and 225 can have gripping members such as spikes 216 and 226, respectively.

The rear strap 210 and the front strap 220 can be coupled together at their top end via connection 230. The connection 230 can be stitching, cleats, rivets, buttons, snaps, or other methods of mechanical coupling known in the art of textiles. The rear strap 210 and the front strap 220 can be formed from a single piece of material that is folded approximately in half where a first half can be the rear strap 210 and a second half can be the front strap 220. Thus, although the rear strap 210 and the front strap 220 are referred throughout the specification as separate straps, those of skill in the art will appreciate that the rear strap 210 and the front strap 220 can be formed from a single piece of material.

The rear strap 210 and the front strap 220 can be formed from leather, nylon, plastic, cotton, or other natural or man-made materials. The rear strap 210 and the front strap 220 are desirably flexible, although rigid materials are contemplated. The rear strap 210 and the front strap 220 are desirably formed from the same type of material and, in preferred embodiments of the invention, are formed from nylon webbing, leather, or leatherette. When the rear strap 210 and the front strap 220 are formed from a single piece of material, the single piece of material can be folded over the hook 240. The connection 230 can securely bind the rear strap 210 and the front strap 220 to the hook.

The rear strap 210 and the front strap 220 can each, respectively, be formed from a double layer of material. When the rear strap 210 and the front strap 220 are formed from a double layer of material, perimeter stitching 213 on the rear strap 210 and perimeter stitching 223 on the front strap 220 can bind the double layer together.

The rear strap 210 can have a ferromagnetic member 215 near its lower end 211 and the front strap 220 can have a ferromagnetic member 225 in its lower end 221. The ferromagnetic member 215 and 225 can be, for example, formed from a ferrous material such as iron disks or washers. The ferromagnetic member 215 and 225 can be permanent magnets such as neodymium disk-shaped magnets. In embodiments of the invention the ferromagnetic member 215 is an iron disk and the ferromagnetic member 225 is a neodymium disk-shaped magnet. In preferred embodiments of the invention, the ferromagnetic members 215 and 225 are both neodymium disk-shaped magnets each having a positive pole on one flat side of the disk and having an opposite, negative pole, on the other side of the disk. When the ferromagnetic members 215 and 225 are both magnets, they can be disposed at the respective lower ends 211 and 221 such that the opposite poles face one another. The lower ends 211 and 221 can be held together by the force of magnetic attraction between the ferromagnetic members 215 and 225.

In use, the brim of a hat can be placed between the ferromagnetic members 215 and 225 and the force of magnetic attraction between the ferromagnetic members 215 and 225 can substantially hold the hat between the ferromagnetic members 215 and 225.

Embodiments of the invention can include gripping members such as spikes 216 and 226 near the ferromagnetic members 215 and 225. The gripping members 216 and 226 can concentrate the force between the ferromagnetic members 215 and 225 over a smaller area more effectively pinching or gripping a hat inserted therebetween. The size and number of gripping members 216 and 226 has been exaggerated in the attached drawings for clarity and ease of illustration. Those of skill in the art will appreciate that that the materials, number, arrangement, and size of the gripping members can be chosen to suit hats of varying compositions. Although the embodiment of FIG. 2C is shown as having gripping members 216 and 226 on both the rear strap 210 and the front strap 220, it is contemplated that gripping members 216 and 226 may only be present on only one of the rear strap 210 or the front strap 220. When the gripping members 216 and 226 are spikes as illustrated in FIG. 2C, the spikes are preferably made from metal pins or injection molded plastic formed in ridges or rows. In other embodiments, the gripping members 216 and 226 are formed from an abrasive material such as sandpaper or sticky material such as silicon. The force of magnetic attraction between the ferromagnetic members 215 and 225 can press the gripping members 216 and 226 into the hat to more securely retain the hat therein.

The rear strap 210 and the front strap 220 are preferably formed from a double layer of material and the ferromagnetic members 215 and 225 are preferably disposed between the double layers of material. Stitching, glue, rivets, or other fasteners can hold the ferromagnetic members 215 and 225 in place. In other embodiments, the ferromagnetic members 215 and 225 can be surface mounted on the rear strap 210 and the front strap 220.

The rear strap 210 and the front strap 220 can be connected to a hook 240. The hook 240 can be used to attach the assembly to another object such as a beltloop or an eyelet on a suitcase or purse. The hook 240 can have a spring-loaded gate 245 that can prevent the hook from becoming inadvertently dislodged.

Embodiments of the invention can omit the hook 240 and instead the top ends 212 and 222 can be permanently attached to another object. For example, the top ends 212 and 222 can be sewn into the inside of a purse or travel bag. When not in use, the whole assembly can be disposed out of sight inside the purse or travel bag. In use, the lower ends 211 and 221 can be pulled to the outside of the purse or travel bag and be used to engage and retain the brim of a hat. In this way, a hat so retained can "ride" on the outside of the purse or travel bag.

FIG. 3A is an illustration of a strap-style hook for a hat holder, FIG. 3B is an illustration of medallion-style straps for a hat holder, and FIG. 3C is an illustration of a strap-style hook connected to a medallion-style straps via an extension member, all according to exemplary embodiments of the invention. As shown in FIG. 3A-3C, a hat holder includes a rear strap 310, a front strap 320, a connection 330, a hook 340, and extension members 350. The rear strap 310 can have a ferromagnetic member 315, bottom end 311, a top end 312, and perimeter stitching 313. The front strap 320 can have a ferromagnetic member 325, a bottom end 321, a top end 322, and perimeter stitching 323. The hook 340 can have a closure 345.

The rear strap 310 and the front strap 320 can be coupled together at their top end via connection 330. The connection 330 can be stitching, cleats, rivets, buttons, snaps, or other methods of mechanical coupling known in the art of textiles. The rear strap 310 and the front strap 320 can be formed from a single piece of material that is folded approximately in half where a first half can be the rear strap 310 and a second half can be the front strap 320. Thus, although the rear strap 310 and the front strap 320 are referred throughout the specification as separate straps, those of skill in the art will appreciate that the rear strap 310 and the front strap 320 can be formed from a single piece of material.

The rear strap 310 and the front strap 320 can be formed from leather, nylon, plastic, cotton, or other natural or man-made materials. The rear strap 310 and the front strap 320 are desirably flexible, although rigid materials are contemplated. The rear strap 310 and the front strap 320 are desirably formed from the same type of material and, in preferred embodiments of the invention, are formed from nylon webbing, leather, or leatherette. When the rear strap 310 and the front strap 320 are formed from a single piece of material, the single piece of material can be folded over one of the extensions members 350 to secure it thereto. The connection 330 can securely bind the rear strap 310 and the front strap 320 to the extension member 350.

The rear strap 310 and the front strap 320 can each, respectively, be formed from a double layer of material. When the rear strap 310 and the front strap 320 are formed from a double layer of material, perimeter stitching 313 on the rear strap 310 and perimeter stitching 323 on the front strap 320 can bind the double layer together.

The rear strap 310 can have a ferromagnetic member 315 near its lower end 311 and the front strap 320 can have a ferromagnetic member 325 in its lower end 321. The ferromagnetic member 315 and 325 can be, for example, formed from a ferrous material such as iron disks or washers. The ferromagnetic member 315 and 325 can be permanent magnets such as neodymium disk-shaped magnets. In embodiments of the invention the ferromagnetic member 315 is an iron disk and the ferromagnetic member 325 is a neodymium disk-shaped magnet. In preferred embodiments of the invention, the ferromagnetic members 315 and 325 are both neodymium disk-shaped magnets each having a positive pole on one flat side of the disk and having an opposite, negative pole, on the other side of the disk. When the ferromagnetic members 315 and 325 are both magnets, they can be disposed at the respective lower ends 311 and 321 such that the opposite poles face one another. The lower ends 311 and 321 can be held together by the force of magnetic attraction between the ferromagnetic members 315 and 325.

In use, the brim of a hat can be placed between the ferromagnetic members 315 and 325 and the force of magnetic attraction between the ferromagnetic members 315 and 325 can substantially hold the hat between the ferromagnetic members 315 and 325. Embodiments of the invention can include gripping members (not shown) such as spikes or abrasive material near the ferromagnetic members 315 and 325.

The rear strap 310 and the front strap 320 are preferably formed from a double layer of material and the ferromagnetic members 315 and 325 are preferably disposed between the double layers of material. Stitching, glue, rivets, or other fasteners can hold the ferromagnetic members 315 and 325 in place. In other embodiments, the ferromagnetic members 315 and 325 can be surface mounted on the rear strap 310 and the front strap 320.

The rear strap 310 and the front strap 320 can be connected to extension members 350. The extension members 350 can connect to the hook 340 which can in turn be used to attach the hat holder to another object such as a belt. The extension members 350 can provide length to the hat holder so that a hat retained therein is further from the point where the hook 340 is attached to another object. In the example of where the hook 340 is attached to a user's belt, a hat retained in the hat holder would be very close to the user's waist without the extension member. If the hat were close to the user's waist, the hat would be susceptible to inadvertent damage from pinching or crushing by become trapped between user's torso and thigh. Thus, the extension members 350 are advantageous to lengthen the hat holder and prevent a hat from being exposed to hazards present near the connection point of the hook 340 to another object (such as a user's belt).

Although the extension member 350 has been illustrated as four interlocking rings, other types of extension members 350 are contemplates including, for example, straps, chains, and ropes.

The hook 340 can have a closure 345 such as a snap, button or Velcro, that can securely close the hook. In the embodiment of FIG. 3A-3C the hook 340 is formed from a strap of flexible material. The flexible material can be, for example, nylon, leather, or leatherette. The hook 340 can be formed from the same material as the front or rear straps 310 and 320, respectively. The hook 340 can be used to attach the hat holder to another object such as a user's belt or a strap or eyelet of a luggage or purse.

Embodiments of the invention can omit the hook 340 and instead the extension member 350 can be permanently attached to another object. For example, the extension member 350 can be sewn or attached to the inside of a purse or travel bag. When not in use, the whole assembly can be disposed out of sight inside the purse or travel bag. In use, the extension member can be pulled to the outside of the purse or travel bag and be used to engage and retain the brim of a hat. In this way, a hat so retained can "ride" on the outside of the purse or travel bag.

Figures 4A, 4B:
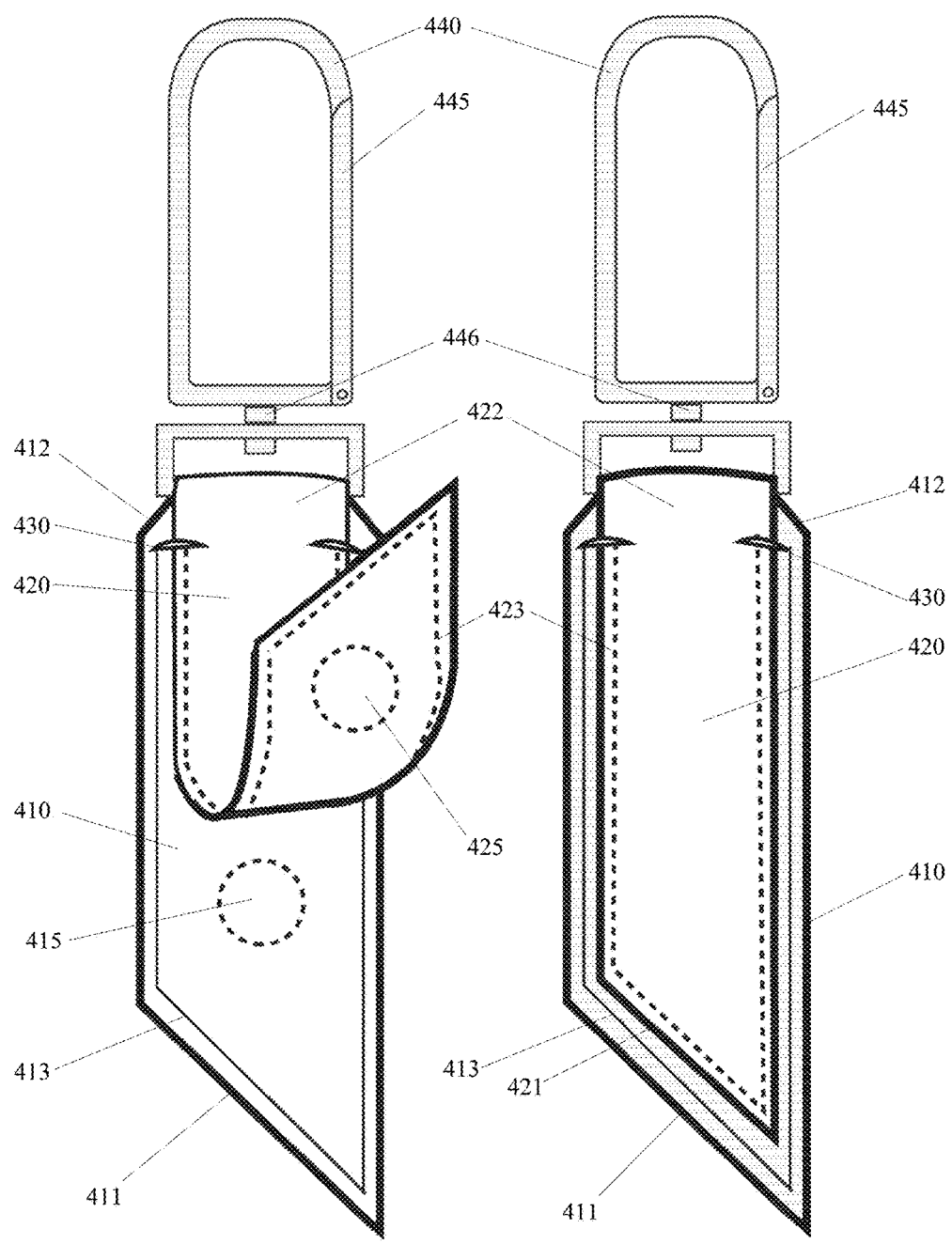
FIG. 4A-4B are illustrations of a hat holder according to an exemplary embodiment of the invention.

FIG. 4A and FIG. 4B are front-view illustrations of a hat holder according to an exemplary embodiment of the invention. As shown in FIG. 4A-4B, a hat holder includes a rear strap 410, a front strap 420, a connection 430, and hook 440. The rear strap 410 can have a ferromagnetic member 415, bottom end 411, a top end 412, and perimeter stitching 413. The front strap 420 can have a ferromagnetic member 425, a bottom end 421, a top end 422, and perimeter stitching 423. The hook 440 can have a gate 445 and a swivel 446.

The rear strap 410 and the front strap 420 can be coupled together at their top end via connection 430. The connection 430 can be stitching, cleats, rivets, buttons, snaps, or other methods of mechanical coupling known in the art of textiles. The rear strap 410 and the front strap 420 can be formed from a single piece of material that is folded approximately in half where a first half can be the rear strap 410 and a second half can be the front strap 420. Thus, although the rear strap 410 and the front strap 420 are referred throughout the specification as separate straps, those of skill in the art will appreciate that the rear strap 410 and the front strap 420 can be formed from a single piece of material.

The rear strap 410 and the front strap 420 can be formed from leather, nylon, plastic, cotton, or other natural or man-made materials. The rear strap 410 and the front strap 420 are desirably flexible, although rigid materials are contemplated. The rear strap 410 and the front strap 420 are desirably formed from the same type of material and, in preferred embodiments of the invention, are formed from nylon webbing, leather, or leatherette. When the rear strap 410 and the front strap 420 are formed from a single piece of material, the single piece of material can be folded over part of the hook 440. The connection 430 can securely bind the rear strap 410 and the front strap 420 to the hook.

The rear strap 410 and the front strap 420 can each, respectively, be formed from a double layer of material. When the rear strap 410 and the front strap 420 are formed from a double layer of material, perimeter stitching 413 on the rear strap 410 and perimeter stitching 423 on the front strap 420 can bind the double layer together.

The rear strap 410 can have a ferromagnetic member 415 near its lower end 411 and the front strap 420 can have a ferromagnetic member 425 in its lower end 421. The ferromagnetic member 415 and 425 can be, for example, formed from a ferrous material such as iron disks or washers. The ferromagnetic member 415 and 425 can be permanent magnets such as neodymium disk-shaped magnets. In embodiments of the invention the ferromagnetic member 415 is an iron disk and the ferromagnetic member 425 is a neodymium disk-shaped magnet. In preferred embodiments of the invention, the ferromagnetic members 415 and 425 are both neodymium disk-shaped magnets each having a positive pole on one flat side of the disk and having an opposite, negative pole, on the other side of the disk. When the ferromagnetic members 415 and 425 are both magnets, they can be disposed at the respective lower ends 411 and 421 such that the opposite poles face one another. The lower ends 411 and 421 can be held together by the force of magnetic attraction between the ferromagnetic members 415 and 425.

In use, the brim of a hat can be placed between the ferromagnetic members 415 and 425 and the force of magnetic attraction between the ferromagnetic members 415 and 425 can substantially hold the hat between the ferromagnetic members 415 and 425. Embodiments of the invention can include gripping members (not shown) such as spikes or abrasive material near the ferromagnetic members 415 and 425.

The rear strap 410 and the front strap 420 are preferably formed from a double layer of material and the ferromagnetic members 415 and 425 are preferably disposed between the double layers of material. Stitching, glue, rivets, or other fasteners can hold the ferromagnetic members 415 and 425 in place. In other embodiments, the ferromagnetic members 415 and 425 can be surface mounted on the rear strap 410 and the front strap 420.

The rear strap 410 and the front strap 420 can be connected to a hook 440. The hook 440 can be used to attach the assembly to another object such as a beltloop or an eyelet on a suitcase or purse. The hook 440 can have a spring-loaded gate 445 that can prevent the hook from becoming inadvertently dislodged. The hook 440 can have a swivel 446 so that the hook 440 can rotate with respect to the straps 410 and 420 thereby allowing the hook to be rotated to a desirable position to attach to another object.

Embodiments of the invention can omit the hook 440 and instead the top ends 412 and 422 can be permanently attached to another object. For example, the top ends 412 and 422 can be sewn into the inside of a purse or travel bag. When not in use, the whole assembly can be disposed out of sight inside the purse or travel bag. In use, the lower ends 411 and 421 can be pulled to the outside of the purse or travel bag and be used to engage and retain the brim of a hat. In this way, a hat so retained can "ride" on the outside of the purse or travel bag.

FIG. 5A-5B are illustrations of a luggage tag style hat holder according to exemplary embodiments of the invention. As shown in FIG. 5A-5B, a hat holder includes a rear strap 510, a front strap 520, a connection 530, a hook 540, and extension member 550. The rear strap 510 can have a ferromagnetic member 515, bottom end 511, a top end 512, and perimeter stitching 513. The front strap 520 can have a ferromagnetic member 525, a bottom end 521, a top end 522, and perimeter stitching 523. The hook 540 can have a closure 545.

The rear strap 510 and the front strap 520 can be coupled together at their top end via connection 530. The connection 530 can be stitching, cleats, rivets, buttons, snaps, or other methods of mechanical coupling known in the art of textiles. The rear strap 510 and the front strap 520 can be formed from a single piece of material that is folded approximately in half where a first half can be the rear strap 510 and a second half can be the front strap 520. Thus, although the rear strap 510 and the front strap 520 are referred throughout the specification as separate straps, those of skill in the art will appreciate that the rear strap 510 and the front strap 520 can be formed from a single piece of material.

The rear strap 510 and the front strap 520 can be formed from leather, nylon, plastic, cotton, or other natural or man-made materials. The rear strap 510 and the front strap 520 are desirably flexible, although rigid materials are contemplated. The rear strap 510 and the front strap 520 are desirably formed from the same type of material and, in preferred embodiments of the invention, are formed from nylon webbing, leather, or leatherette. The connection 530 can securely bind the rear strap 510 to the front strap 520. The extension member 550 can be formed from the same piece of material as either the rear strap 510 to the front strap 520.

The rear strap 510 and the front strap 520 can each, respectively, be formed from a double layer of material. When the rear strap 510 and the front strap 520 are formed from a double layer of material, perimeter stitching 513 on the rear strap 510 and perimeter stitching 523 on the front strap 520 can bind the double layer together.

The rear strap 510 can have a ferromagnetic member 515 near its lower end 511 and the front strap 520 can have a ferromagnetic member 525 in its lower end 521. The ferromagnetic member 515 and 525 can be, for example, formed from a ferrous material such as iron disks or washers. The ferromagnetic member 515 and 525 can be permanent magnets such as neodymium disk-shaped magnets. In embodiments of the invention the ferromagnetic member 515 is an iron disk and the ferromagnetic member 525 is a neodymium disk-shaped magnet. In preferred embodiments of the invention, the ferromagnetic members 515 and 525 are both neodymium disk-shaped magnets each having a positive pole on one flat side of the disk and having an opposite, negative pole, on the other side of the disk. When the ferromagnetic members 515 and 525 are both magnets, they can be disposed at the respective lower ends 511 and 521 such that the opposite poles face one another. The lower ends 511 and 521 can be held together by the force of magnetic attraction between the ferromagnetic members 515 and 525.

In use, the brim of a hat can be placed between the ferromagnetic members 515 and 525 and the force of magnetic attraction between the ferromagnetic members 515 and 525 can substantially hold the hat between the ferromagnetic members 515 and 525. Embodiments of the invention can include gripping members (not shown) such as spikes or abrasive material near the ferromagnetic members 515 and 525.

The rear strap 510 and the front strap 520 are preferably formed from a double layer of material and the ferromagnetic members 515 and 525 are preferably disposed between the double layers of material. Stitching, glue, rivets, or other fasteners can hold the ferromagnetic members 515 and 525 in place. In other embodiments, the ferromagnetic members 515 and 525 can be surface mounted on the rear strap 510 and the front strap 520.

The rear strap 510 and the front strap 520 can be connected to extension member 550. The extension member 550 can connect to the hook 540 which can in turn be used to attach the hat holder to another object such as a belt. The extension member 550 can increase the distance between hook and the straps 510 and 520. The extension member 550 can provide length to the hat holder so that a hat retained therein is further from the point where the hook 540 is attached to another object. In the example of where the hook 540 is attached to a user's belt, a hat retained in the hat holder would be very close to the user's waist without the extension member. If the hat were close to the user's waist, the hat would be susceptible to inadvertent damage from pinching or crushing by become trapped between user's torso and thigh. Thus, the extension member 550 is advantageous to lengthen the hat holder and prevent a hat from being exposed to hazards present near the connection point of the hook 540 to another object (such as a user's belt).

Although the extension member 550 has been illustrated as a single piece of material formed from the same piece of material as the front strap 520, other types of extension members are contemplates including, for example, straps, chains, and ropes.

The hook 540 can have a closure 545 such as a snap, button, or Velcro, that can securely close the hook. In the embodiment of FIG. 5A-5B the hook 540 is formed from a strap of flexible material. The flexible material can be, for example, nylon, leather, or leatherette. The hook 540 can be formed from the same material as the front or rear straps 510 and 520, respectively. The hook 540 can be used to attach the hat holder to another object such as a user's belt or a strap or eyelet of a luggage or purse.

Embodiments of the invention can omit the hook 540 and instead the extension member 550 can be permanently attached to another object. For example, the extension member 550 can be sewn or attached to the inside of a purse or travel bag. When not in use, the whole assembly can be disposed out of sight inside the purse or travel bag. In use, the extension member can be pulled to the outside of the purse or travel bag and be used to engage and retain the brim of a hat. In this way, a hat so retained can "ride" on the outside of the purse or travel bag.

Figures 6A, 6B:
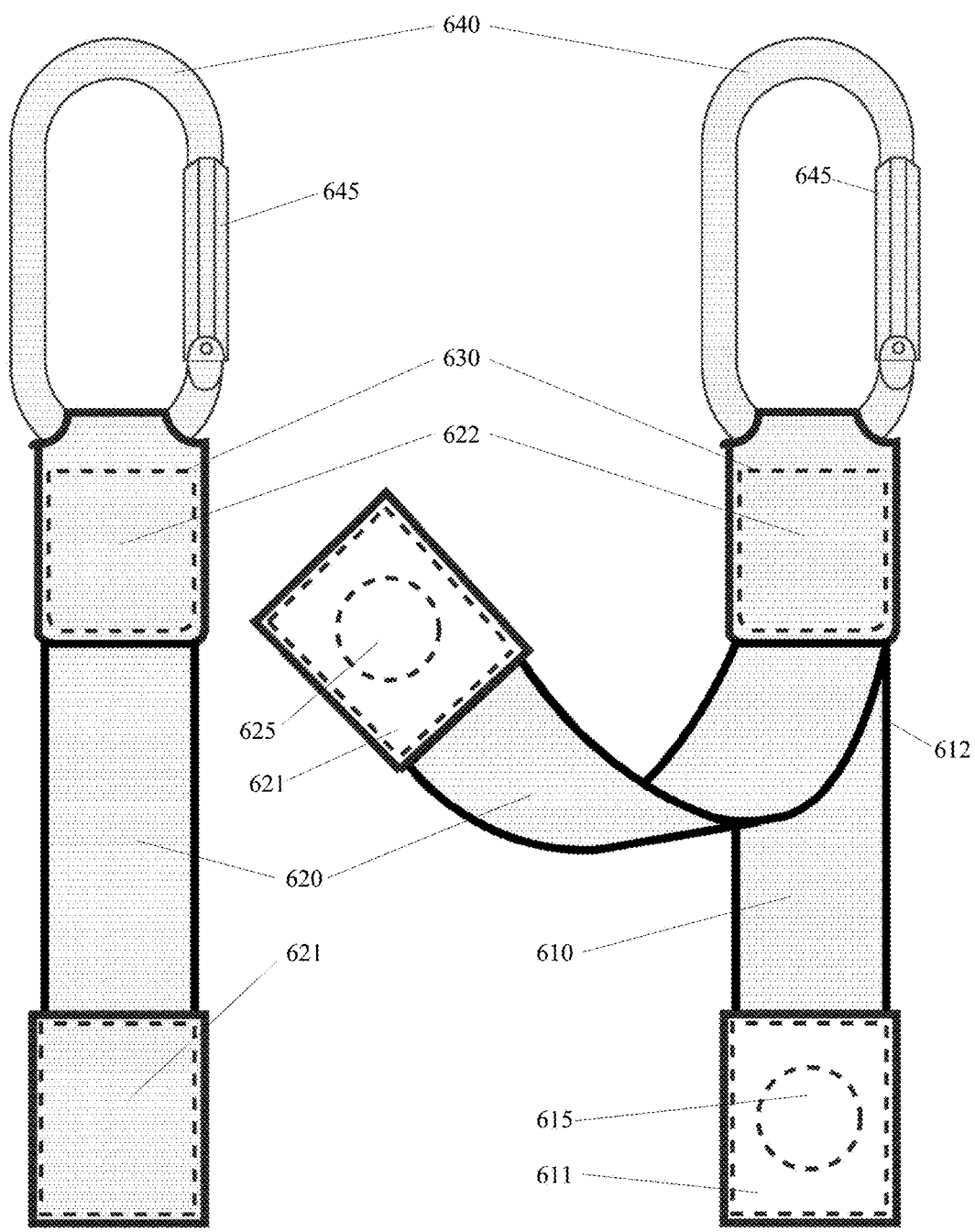
FIG. 6A-6B are illustrations of a hat holder according to an exemplary embodiment of the invention.

FIG. 6A and FIG. 6B are front-view illustrations of a carabiner-style hat holder according to an exemplary embodiment of the invention. As shown in FIG. 6A-6B, a hat holder includes a rear strap 610, a front strap 620, a connection 630, and hook 640. The rear strap 610 can have a ferromagnetic member 615, bottom end 611, a top end 612, and perimeter stitching 613. The front strap 620 can have a ferromagnetic member 625, a bottom end 621, a top end 622, and perimeter stitching 623. The hook 640 can have a gate 645.

The rear strap 610 and the front strap 620 can be coupled together at their top end via connection 630. The connection 630 can be stitching, cleats, rivets, buttons, snaps, or other methods of mechanical coupling known in the art of textiles. The rear strap 610 and the front strap 620 can be formed from a single piece of material that is folded approximately in half where a first half can be the rear strap 610 and a second half can be the front strap 620. Thus, although the rear strap 610 and the front strap 620 are referred throughout the specification as separate straps, those of skill in the art will appreciate that the rear strap 610 and the front strap 620 can be formed from a single piece of material.

The rear strap 610 and the front strap 620 can be formed from leather, nylon, plastic, cotton, or other natural or man-made materials. The rear strap 610 and the front strap 620 are desirably flexible, although rigid materials are contemplated. The rear strap 610 and the front strap 620 are desirably formed from the same type of material and, in preferred embodiments of the invention, are formed from nylon webbing, leather, or leatherette. When the rear strap 610 and the front strap 620 are formed from a single piece of material, the single piece of material can be folded over part of the hook 640. The connection 630 can securely bind the rear strap 610 and the front strap 620 to the hook.

The rear strap 610 and the front strap 620 can each, respectively, be formed from a double layer of material. When the rear strap 610 and the front strap 620 are formed from a double layer of material, perimeter stitching 613 on the rear strap 610 and perimeter stitching 623 on the front strap 620 can bind the double layer together.

The rear strap 610 can have a ferromagnetic member 615 near its lower end 611 and the front strap 620 can have a ferromagnetic member 625 in its lower end 621. The ferromagnetic member 615 and 625 can be, for example, formed from a ferrous material such as iron disks or washers. The ferromagnetic member 615 and 625 can be permanent magnets such as neodymium disk-shaped magnets. In embodiments of the invention the ferromagnetic member 615 is an iron disk and the ferromagnetic member 625 is a neodymium disk-shaped magnet. In preferred embodiments of the invention, the ferromagnetic members 615 and 625 are both neodymium disk-shaped magnets each having a positive pole on one flat side of the disk and having an opposite, negative pole, on the other side of the disk. When the ferromagnetic members 615 and 625 are both magnets, they can be disposed at the respective lower ends 611 and 621 such that the opposite poles face one another. The lower ends 611 and 621 can be held together by the force of magnetic attraction between the ferromagnetic members 615 and 625.

In use, the brim of a hat can be placed between the ferromagnetic members 615 and 625 and the force of magnetic attraction between the ferromagnetic members 615 and 625 can substantially hold the hat between the ferromagnetic members 615 and 625. Embodiments of the invention can include gripping members (not shown) such as spikes or abrasive material near the ferromagnetic members 615 and 625.

The lower ends 611 and 621 of the rear strap 610 and the front strap 620 (respectively) are preferably formed from a double layer of material and the ferromagnetic members 615 and 625 are preferably disposed between the double layers of material. Stitching, glue, rivets, or other fasteners can hold the ferromagnetic members 615 and 625 in place. In other embodiments, the ferromagnetic members 615 and 625 can be surface mounted on the rear strap 610 and the front strap 620.

The rear strap 610 and the front strap 620 can be connected to a hook 640. The hook 640 can be used to attach the assembly to another object such as a beltloop or an eyelet on a suitcase or purse. The hook 640 can have a spring-loaded gate 645 that can prevent the hook from becoming inadvertently dislodged. The hook 640 can be a carabiner.

Embodiments of the invention can omit the hook 640 and instead the top ends 612 and 622 can be permanently attached to another object. For example, the top ends 612 and 622 can be sewn into the inside of a purse or travel bag. When not in use, the whole assembly can be disposed out of sight inside the purse or travel bag. In use, the lower ends 611 and 621 can be pulled to the outside of the purse or travel bag and be used to engage and retain the brim of a hat. In this way, a hat so retained can "ride" on the outside of the purse or travel bag.

Figure 7:
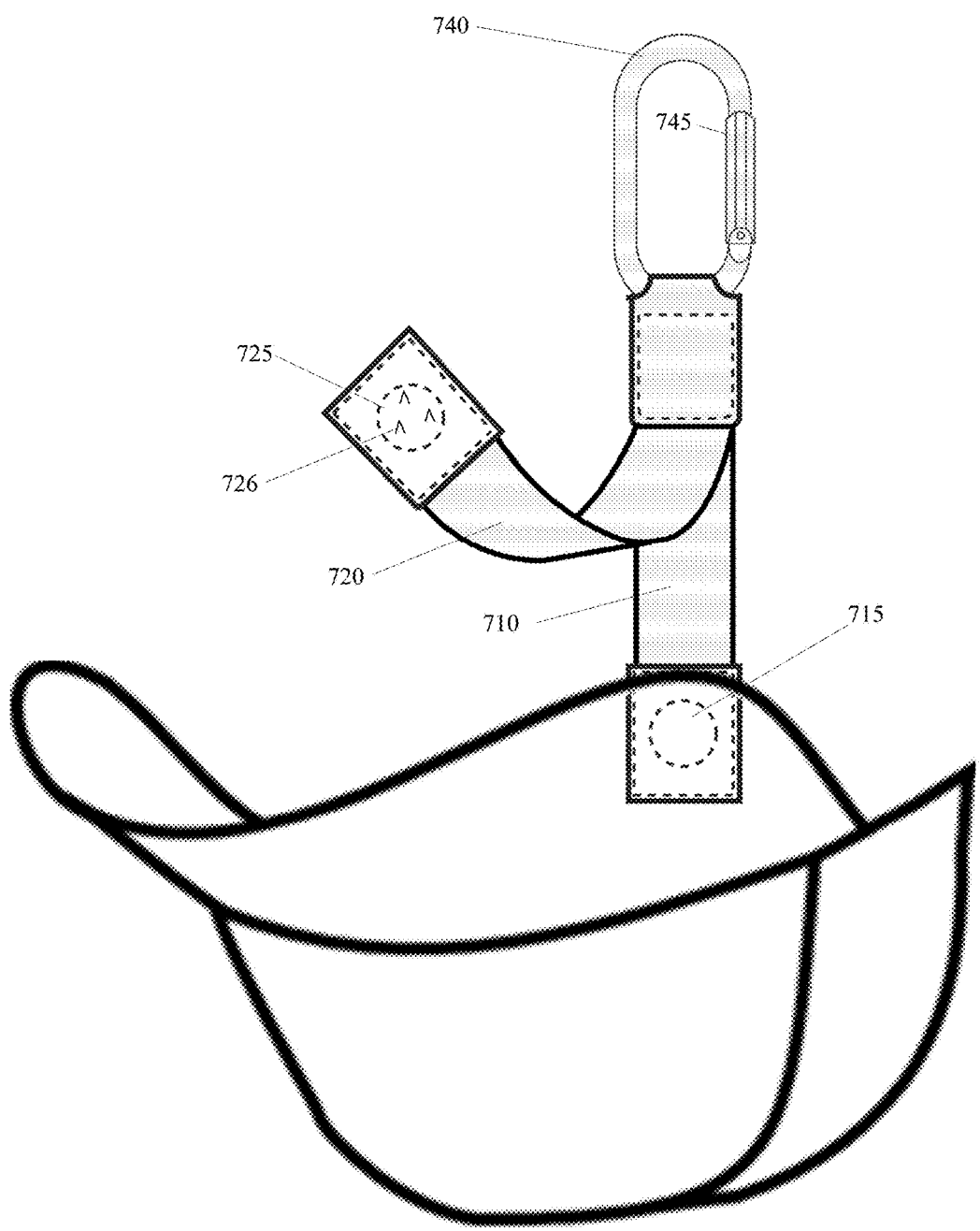
FIG. 7 is an illustration of a hat holder and a hat according to an exemplary embodiment of the invention.

FIG. 7 is an illustration of a carabiner-style hat holder and a hat according to an exemplary embodiment of the invention. As shown in FIG. 7, a hat holder includes a rear strap 710, a front strap 720, a carabiner hook 740. The rear strap 710 includes a ferromagnetic member 715 such as a neodymium magnet and one or more gripping members 726. The front strap 720 includes a ferromagnetic member 725 such as a neodymium magnet and the carabiner 740 can include a gate 745.

In use, the brim of a hat (not labeled) can be positioned between the two ferromagnetic members 715 and 725. The force of magnetic attraction can pull the two ferromagnetic members 715 and 725 together thus retaining the hat therein. To remove the hat, a user can pull the ferromagnetic members 715 and 725 apart.

The gripping members 726 can be positioned near the ferromagnetic member 725 to focus the force of magnetic attraction over a smaller area thereby providing a more secure grip on the hat. While the ferromagnetic members 715 and 725 have been shown and described as gripping the brim of a hat, it is contemplated that other portions of the hat may be similarly retained by the ferromagnetic members 715 and 725 and thus the invention is not limited to gripping only the brim. It is further contemplated that other items may be retained between the ferromagnetic members 715 and 725 of the invention such as sunglasses, scarves, gloves, other fashion accessories, and non-apparel such as papers, pencils, grocery bags, and other light-weight items. Although the gripping member 726 has been illustrated as a spike, other configurations are contemplated including ridges or abrasive material such as sand paper.

The carabiner 740 can be attached to another object such as a beltloop, an eyelet of a purse, or a strap or handle of luggage or a bag. The gate 745 can hinge open to allow the carabiner 740 to be securely attached to another object.

Figure 8:
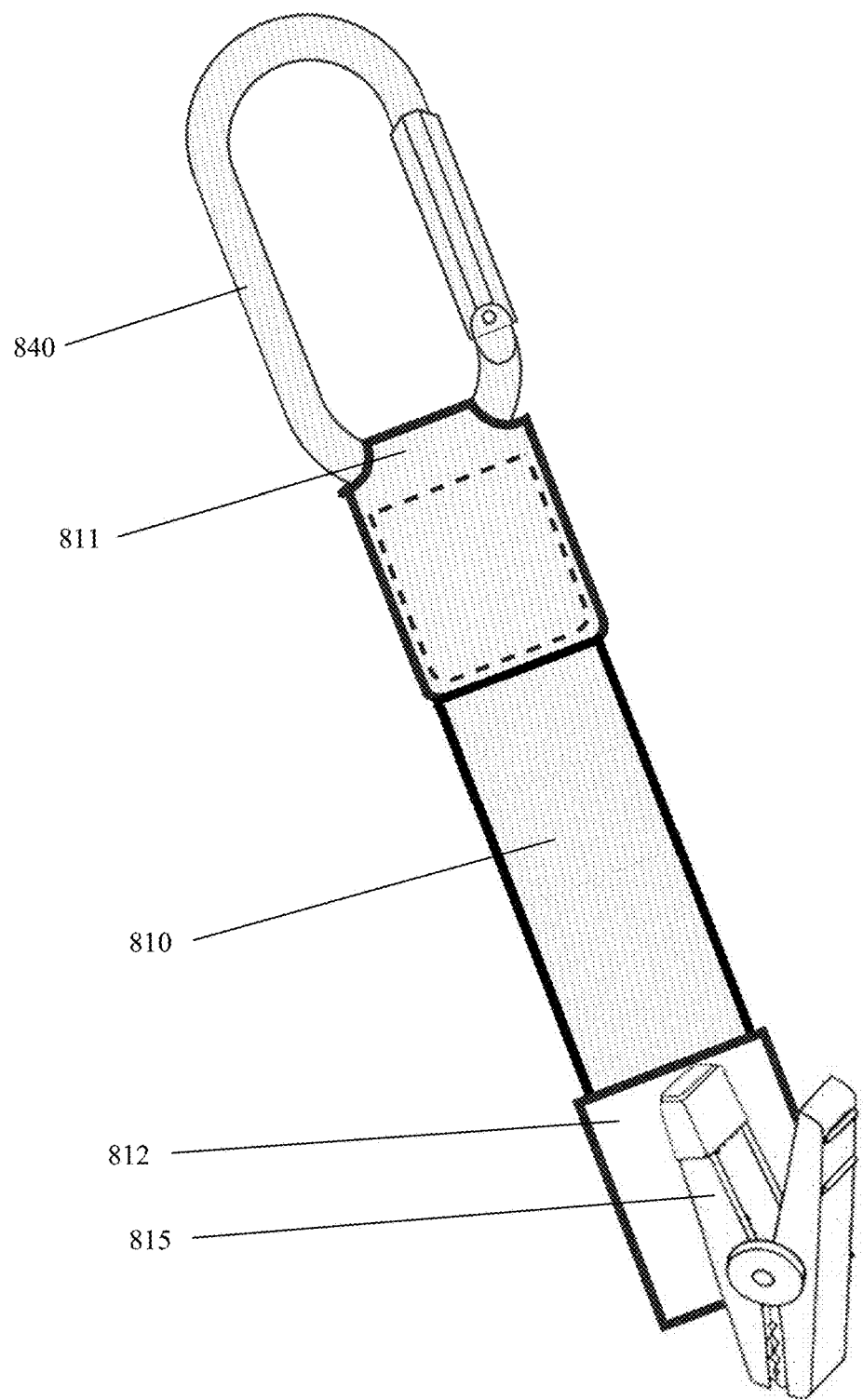
FIG. 8 is an illustration of a hat holder and a hat according to an exemplary embodiment of the invention.

FIG. 8 is an illustration of a hat holder and a hat according to an exemplary embodiment of the invention. As shown in FIG. 8, a hat holder can include a strap 810, a clip 815 and a carabiner 840. The strap 810 can have a top 811 and a bottom 812.

The clip 815 can be attached to the bottom 812 of the strap 810. The clip 815 can be attached by conventional means such as sewing, riveting, gluing, etc. The carabiner 840 can be attached to the top 812 of the strap 810. The carabiner 840 can be attached to another object (not shown) such as a belt loop or a handle of a purse or luggage. The clip 815 can retain a hat (not shown). In use, a portion of a hat (not shown) such as the brim or edge can be inserted into the jaws of the clip 815 and retained therein.

It will be apparent to those skilled in the art that various modifications and variations can be made in the hat holder without departing from the spirit or scope of the invention. Thus, it is intended that embodiments of the invention cover the modifications and variations of this invention provided they come within the scope of the appended claims and their equivalents.

What is claimed is:

1. A system for holding a hat, the system comprising:
   the hat;
   a first strap having a first end and a second end;
   a second strap having a first end and a second end, the second strap joined to the first strap;
   a first ferromagnetic member disposed at the first end of the first strap;
   a second ferromagnetic member disposed at the first end of the second strap;
   a hook coupled to the first strap;
   wherein the first strap and the second strap are configured to be separably joined at their respective first ends by a force of magnetic attraction between the first ferromagnetic member and the second ferromagnetic member; and
   wherein the first strap and the second strap are configured to retain a portion of the hat therebetween.

2. The system of claim 1 wherein the hook is disposed at the second end of the first strap.

3. The system of claim 1 further comprising:
   an extension member disposed between the second end of the first strap and the hook.

4. The system of claim 1 wherein the second end of the first strap is joined to the second end of the second strap.

5. The system of claim 1 further comprising:
   a first gripping member at the first end of the first strap.

6. The system of claim 5 further comprising:
   a second gripping member at the first end of the second strap.

7. The system of claim 5 wherein the first gripping member is an abrasive material.

8. The system of claim 5 wherein the first gripping member is a spike.

9. The system of claim 1 wherein the hook is a rigid loop having a gate.

10. The system of claim 1 wherein the hook is flexible strap having a closure.

11. The system of claim 1 wherein the first ferromagnetic material is disposed in the first end of the first strap.

12. The system of claim 1 wherein the first ferromagnetic material is sewn into the first end of the first strap.

13. The system of claim 1 wherein the first strap and the second strap are formed from a single folded strap.

14. The system of claim 1 wherein the first ferromagnetic member is a permanent magnet.

15. The system of claim 1 wherein the first ferromagnetic member is a first permanent magnet having a first magnetic pole and the second ferromagnetic member is a second permanent magnet having a second magnetic pole; wherein the first permanent magnet is positioned on the first strap to face the second permanent magnet on the second strap; and wherein the first magnetic pole is an opposite pole of the second magnetic pole.

16. A system for holding a hat, the system comprising:
   the hat;
   a first strap having a first end and a second end;
   a second strap having a first end and a second end, the second strap joined to the first strap at their respective second ends;
   a magnet coupled to the first end of the first strap;
   a ferromagnetic member coupled to the first end of the second strap;

wherein the first strap and the second strap are configured to be separably joined at their respective first ends by a force of magnetic attraction between the magnet and the ferromagnetic member; and wherein the first strap and the second strap are configured to retain a portion of the hat therebetween.

17. The system of claim 16 wherein the first and second straps are coupled to an interior of a bag.

18. The system of claim 16 further comprising:
a first gripping member at the first end of the first strap;
a second gripping member at the first end of the second strap.

* * * * *